W. C. B. RICHARDSON.
JOURNAL BOXES AND WHEELS.
No. 179,426. Patented July 4, 1876.
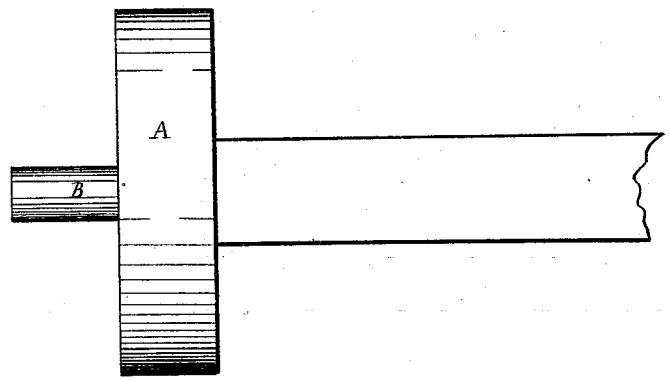
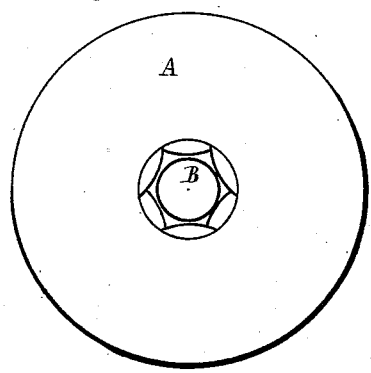
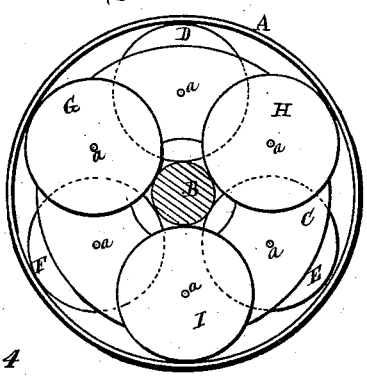
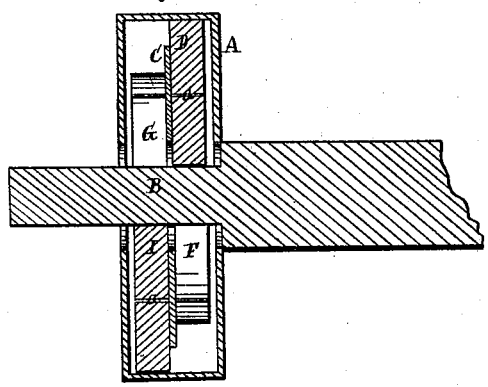
Witnesses
W. K. Kidd
E. W. Cross
Inventor
W. C. B. Richardson
Per Burridge & Co.
Attys.

UNITED STATES PATENT OFFICE.

WILLIAM C. B. RICHARDSON, OF CLEVELAND, OHIO.

IMPROVEMENT IN JOURNAL-BOXES AND WHEELS.

Specification forming part of Letters Patent No. 179,426, dated July 4, 1876; application filed March 27, 1876.

*To all whom it may concern:*

Be it known that I, WILLIAM C. B. RICHARDSON, of Cleveland, in the county of Cuyahoga and State of Ohio, have invented a certain new and Improved Anti-Friction Journal-Box and Wheel; and I do hereby declare that the following is a full, clear, and complete description thereof, reference being had to the accompanying drawings, making a part of the same.

Figure 1 is an edge view of the wheel and axle. Fig. 2 is a side view. Fig. 3 is an inside view. Fig. 4 is a transverse section.

Like letters of reference refer to like parts in the several views.

This invention is a combination of an axle, journal-box, and wheel, the construction of which is substantially as follows: The wheel referred to consists of a shell, A, which may be composed of two sections, fitted and secured to each other in any desirable manner, so that they may be taken apart to obtain access to the inside. The center of the wheel is perforated with a hole for the admission of the axle B. Within said wheel is a broad flat ring, C, Fig. 3, from each side of which project pintles $a$, Fig. 4, three in number, which are the pivotal bearings of the rollers D, E, and F on one side, and the rollers G, H, and I on the other, as will be seen in Fig. 4. The arrangement of the rollers is such as to make a sextuple-sided opening between them for the admission of the axle B, as will be seen in Figs. 2 and 3, and which are also so arranged as to fill the inside diameter of the wheel, so that the edges of the rollers are close to, and run upon, the periphery of the inside of the wheel.

The practical operation of the above-described invention is as follows: It will be obvious, from the relation of the rollers to the wheel, that the axle is supported upon said rollers, and that as the wheel revolves the rollers will revolve upon the axle, and, at the same time, run upon the periphery of the inside of the wheel, thereby causing no, or but little, friction upon the axle.

This wheel is intended, more especially, for railway-cars, and where the tread of the wheel may have a smooth, level surface to run upon, but which, however, may be employed for other vehicles.

What I claim as my invention, and desire to secure by Letters Patent, is—

The rollers G H I, pivoted to the ring C, and arranged, in relation to the rollers D E F, in like manner, pivoted to said ring, and in combination therewith and the wheel A, substantially in the manner as described, and for the purpose specified.

WILLIAM C. B. RICHARDSON.

Witnesses:
W. H. BURRIDGE,
E. W. CROSS.